(12) United States Patent
Sakata et al.

(10) Patent No.: US 7,360,900 B2
(45) Date of Patent: Apr. 22, 2008

(54) ILLUMINATING APPARATUS, IMAGE DISPLAY APPARATUS, AND PROJECTOR

(75) Inventors: Hidefumi Sakata, Tatsuno-cho (JP); Susumu Aruga, Simosuwa-cho (JP); Takashi Takeda, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 127 days.

(21) Appl. No.: 11/047,602

(22) Filed: Feb. 2, 2005

(65) Prior Publication Data

US 2005/0200812 A1    Sep. 15, 2005

(30) Foreign Application Priority Data

Mar. 10, 2004 (JP) ............. 2004-067230
Mar. 29, 2004 (JP) ............. 2004-095605

(51) Int. Cl.
*G03B 21/14* (2006.01)
(52) U.S. Cl. ............. 353/20; 353/94; 349/8
(58) Field of Classification Search .......... 353/20, 353/31, 33, 34, 37, 94; 349/5, 7, 8, 9
See application file for complete search history.

(56) References Cited

U.S. PATENT DOCUMENTS

| | | | |
|---|---|---|---|
| 5,842,762 A | 12/1998 | Clarke | |
| 6,108,131 A | 8/2000 | Hansen et al. | |
| 6,193,393 B1 | 2/2001 | Dove et al. | |
| 6,332,693 B1 | 12/2001 | Dove et al. | |
| 6,336,724 B1 * | 1/2002 | Shouji et al. | 353/20 |
| 6,726,329 B2 * | 4/2004 | Li et al. | 353/20 |
| 6,857,761 B2 * | 2/2005 | Chang | 362/234 |
| 6,921,176 B2 * | 7/2005 | Tomita et al. | 353/94 |
| 7,029,129 B2 * | 4/2006 | Shimada | 353/94 |
| 7,070,281 B2 * | 7/2006 | Kato | 353/20 |
| 7,192,147 B2 | 3/2007 | Sakata et al. | |
| 2001/0048560 A1 | 12/2001 | Sugano | |
| 2002/0135856 A1 | 9/2002 | Penn | |
| 2003/0002151 A1 | 1/2003 | Yano | |
| 2003/0231497 A1 | 12/2003 | Sakata et al. | |
| 2006/0023172 A1 * | 2/2006 | Ikeda et al. | 353/94 |
| 2006/0187520 A1 | 8/2006 | Bierhuizen | |
| 2007/0121310 A1 | 5/2007 | Sakata et al. | |

FOREIGN PATENT DOCUMENTS

EP    1 363 460 A2    11/2003
JP    B2 2622185    4/1997

(Continued)

OTHER PUBLICATIONS

Stupp et al; "Projection Displays"; 1999; John Wiley & Sons; West Sussex, England 301240; XP002397739 7.5.4 Polarizing Beam splitters in the imaging path; 10.3.1.1 Microfilter projector.

*Primary Examiner*—William C. Dowling
(74) *Attorney, Agent, or Firm*—Oliff & Berridge, PLC

(57) ABSTRACT

An illuminating apparatus includes at least two solid light-emitting elements including a first solid light-emitting element and a second solid light-emitting element; a polarized-light combining unit that combines a first polarized light of a first oscillation direction and a second polarized light of a second oscillation direction substantially perpendicular to the second oscillating direction to guide the first polarized light and the second polarized light to an illumination direction by transmitting or reflecting the first polarized light and reflecting or transmitting the second polarized light; and a phase modulating element that converts a polarized light from the polarized-light combining unit into either of the first polarized light and the second polarized light.

17 Claims, 10 Drawing Sheets

FOREIGN PATENT DOCUMENTS

| | | |
|---|---|---|
| JP | A 11-015399 | 1/1999 |
| JP | A-2001-194724 | 7/2001 |
| JP | A 2001-305657 | 11/2001 |
| JP | A-2003-075911 | 3/2003 |
| JP | A-2003-329978 | 11/2003 |
| WO | 0 794 676 A2 | 9/1997 |
| WO | WO 01/11414 A1 | 2/2001 |
| WO | WO 03/098329 A1 | 11/2003 |

* cited by examiner

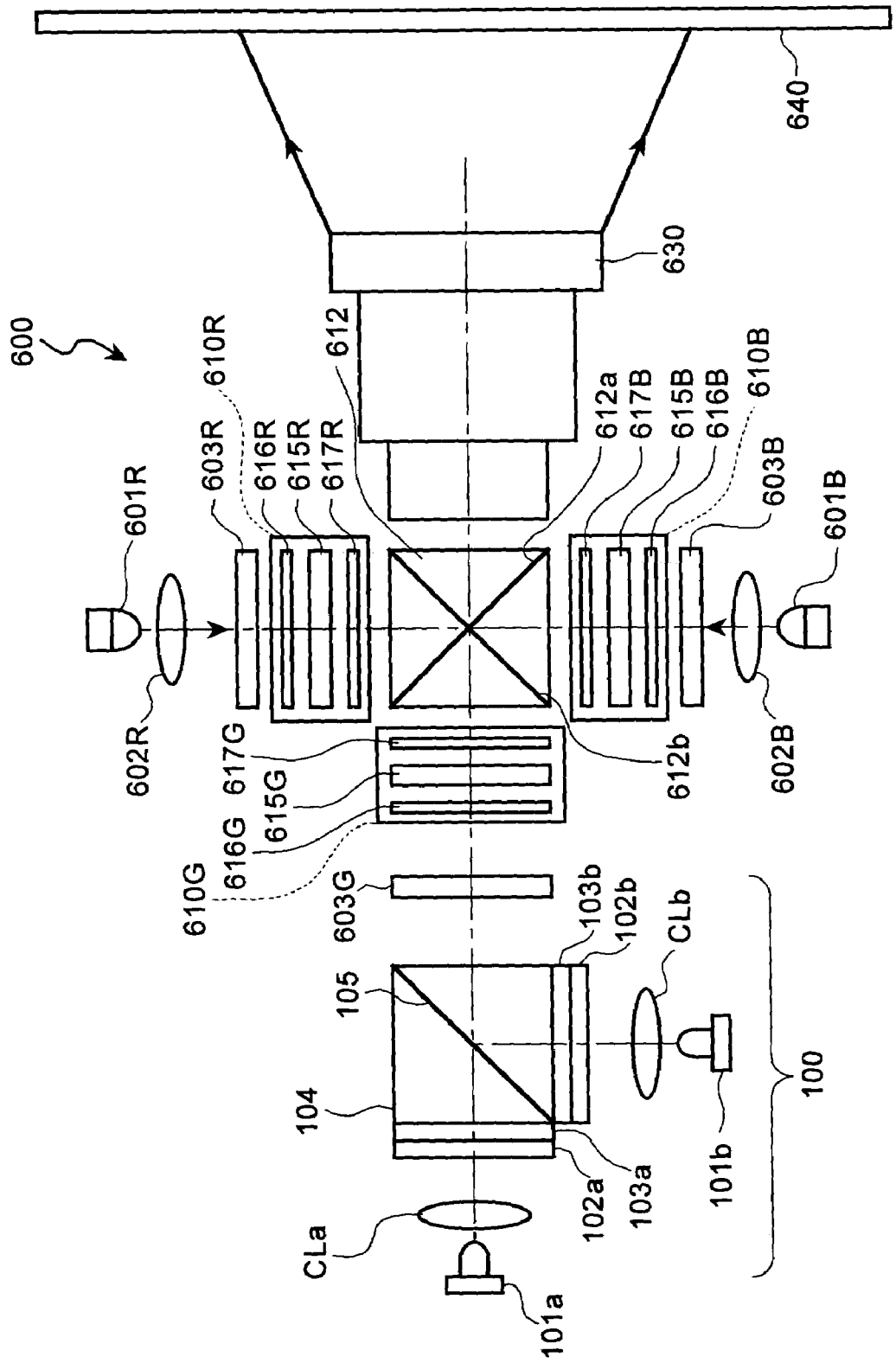

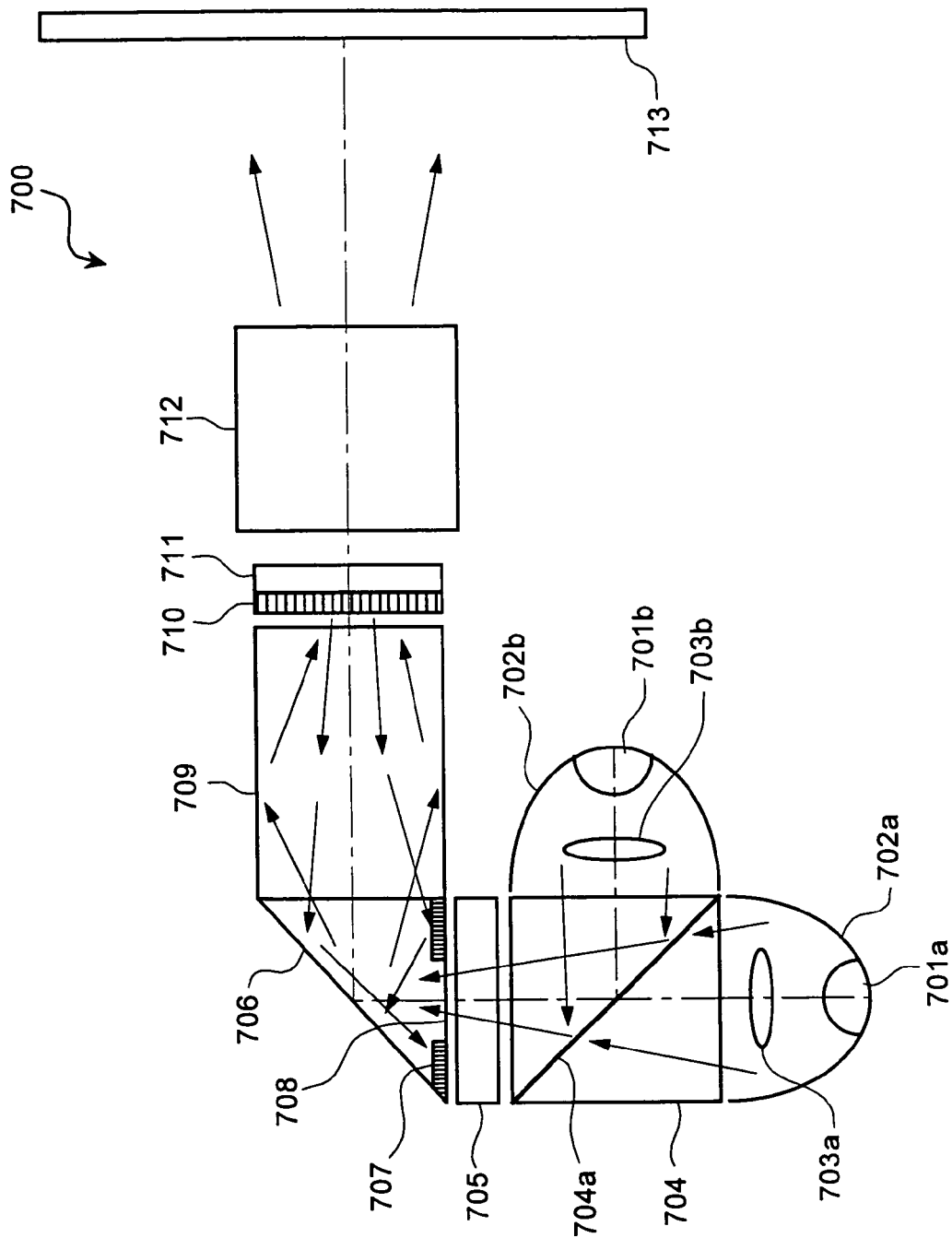

ILLUMINATING APPARATUS, IMAGE DISPLAY APPARATUS, AND PROJECTOR

CROSS-REFERENCE TO RELATED APPLICATIONS

The present document incorporates by reference the entire contents of Japanese priority documents, 2004-67230 filed in Japan on Mar. 10, 2004, and 2004-95605 filed in Japan on Mar. 29, 2004.

BACKGROUND OF THE INVENTION

1) Field of the Invention

The present invention relates to an illuminating apparatus, an image display apparatus, and a projector, and more particularly, to an illuminating apparatus for a projector.

2) Description of the Related Art

Generally, light emitting diode (LED) has an advantage of a long lifetime and a high energy-conversion-efficiency over an ultrahigh-pressure mercury vapor lamp. For this reason, the LED is gaining popularity as light source for an illuminating apparatus. However, a single LED has a smaller emission amount compared to the ultrahigh-pressure mercury vapor lamp. Because a comparatively large amount of light is required for a projector, a technology for making an array of LEDs is proposed in, for example, Japanese Patent Application Laid-Open Publication No. 2001-305657 to achieve a sufficient light intensity.

When a plurality of LEDs is arrayed, the light intensity increases proportional to the number of LEDs. In a projector, it is possible to express a spatial extent, where an effective light flux exists, as a product of dimension and solid angle (etendue, geometrical extent) in an optical system including light source and a spatial light modulator. The product of dimension and solid angle is preserved in the optical system. Hence, if the spatial extent of the light source becomes larger, the spatial extent where the light flux incident on the spatial light modulator becomes larger. However, because an angle that the spatial light modulator can cover is limited, it is difficult to effectively use the light flux from the light source. When a plurality of LEDs is arrayed to increase the light intensity, the dimension of the light source (spatial extent) also increases. Therefore, even if an LED array is employed in a projector to increase the light intensity, it is difficult to effectively use all the light flux from the light source because the etendue is preserved.

In a so-called single-LCD-panel projector that employs a single liquid-crystal spatial-light-modulator, a red light (R-light), a green light (G-light), and a blue light (B-light) are illuminated to corresponding pixels, respectively. The single LCD panel projector has an advantage of a simple and compact configuration over a so-called triple-LCD-panel projector that employs a spatial light modulator for each of color lights. The single LCD panel projector that displays a full color image using a single liquid-crystal spatial-light-modulator can be configured by preparing a pixel for the R-light, a pixel for the G-light, and a pixel for the B-light and illuminating the R-light, the G-light, and the B-light to the pixels corresponding each of the colors, respectively, as proposed in, for example, Japanese Patent No. 2622185.

According to the configuration disclosed in the Japanese Patent No. 2622185, a white light from light source is separated into the R-light, the G-light, and the B-light by color filters that selectively transmit and reflect the R-light, the G-light, and the B-light, respectively. A microlens is disposed for each of three pixels, the pixel for the R-light, the pixel for the G-light, and the pixel for the B-light. Lights passing through the color filters for each of the color lights have different angles, respectively, by which the R-light separated by the color filter is incident on a corresponding pixel for the R-light. Furthermore, the G-light separated by the color filter is incident on a corresponding pixel for the G-light, and the B-light separated by the color filter is incident on a corresponding pixel for the B-light. In this manner, the R-light, the G-light, and the B-light are expressed with three pixels. With this type of configuration, because the white light is separated into three colors by the color filters for each of the colors, an illumination optical system grows in size, and it is difficult to obtain a bright image with an even intensity distribution. As described above, the conventional technology has problems of supplying an illumination light with a high brightness and a high usability and obtaining a bright image with an even intensity distribution.

SUMMARY OF THE INVENTION

It is an object of the present invention to solve at least the above problems in the conventional technology.

An illuminating apparatus according to one aspect of the present invention includes at least two solid light-emitting elements that supply light, the least two solid light-emitting elements including a first solid light-emitting element and a second solid light-emitting element; a polarized-light combining unit that combines a first polarized light of a first oscillation direction and a second polarized light of a second oscillation direction substantially perpendicular to the second oscillating direction to guide the first polarized light and the second polarized light to an illumination direction by transmitting or reflecting the first polarized light and reflecting or transmitting the second polarized light; and a phase modulating element that converts a polarized light from the polarized-light combining unit into either of the first polarized light and the second polarized light.

A projector according to another aspect of the present invention includes an illuminating apparatus; a spatial light modulator that modulates an illumination light from the illuminating apparatus according to an image signal; and a projecting lens that projects the illumination light modulated by the spatial light modulator. The illuminating apparatus includes at least two solid light-emitting elements that supply light, the least two solid light-emitting elements including a first solid light-emitting element and a second solid light-emitting element; a polarized-light combining unit that combines a first polarized light of a first oscillation direction and a second polarized light of a second oscillation direction substantially perpendicular to the second oscillating direction to guide the first polarized light and the second polarized light to an illumination direction by transmitting or reflecting the first polarized light and reflecting or transmitting the second polarized light; and a phase modulating element that converts a polarized light from the polarized-light combining unit into either of the first polarized light and the second polarized light.

An image display apparatus according to still another aspect of the present invention includes at least two solid light-emitting elements that supply light; a polarized-light combining unit that combines a first polarized light of a first oscillation direction and a second polarized light of a second oscillation direction substantially perpendicular to the second oscillating direction to guide the first polarized light and the second polarized light to an illumination direction by transmitting or reflecting the first polarized light and reflecting or transmitting the second polarized light; a phase modulating element that converts a polarized light from the polarized-light combining unit into either of the first polarized light and the second polarized light; a rod integrator for making intensity distribution of the light from the solid light-emitting elements uniform; a color filter that transmits light in a specific wavelength region from among the light from the rod integrator, and reflects light in a wavelength region different from the specific wavelength region; a reflecting portion that is formed on an end surface of the rod integrator on a side of the phase modulating element, and reflects light, which is reflected at the color filter to a direction to the solid light-emitting elements, to a direction to the color filter; and a spatial light modulating element that modulates light from the rod integrator according to an image signal.

A projector according to still another aspect of the present invention includes an image display apparatus; and a projection lens that projects light from the image display apparatus. The image display apparatus includes at least two solid light-emitting elements that supply light; a polarized-light combining unit that combines a first polarized light of a first oscillation direction and a second polarized light of a second oscillation direction substantially perpendicular to the second oscillating direction to guide the first polarized light and the second polarized light to an illumination direction by transmitting or reflecting the first polarized light and reflecting or transmitting the second polarized light; a phase modulating element that converts a polarized light from the polarized-light combining unit into either of the first polarized light and the second polarized light; a rod integrator for making intensity distribution of the light from the solid light-emitting elements uniform; a color filter that transmits light in a specific wavelength region from among the light from the rod integrator, and reflects light in a wavelength region different from the specific wavelength region; a reflecting portion that is formed on an end surface of the rod integrator on a side of the phase modulating element, and reflects light, which is reflected at the color filter to a direction to the solid light-emitting elements, to a direction to the color filter; and a spatial light modulating element that modulates light from the rod integrator according to an image signal.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 6 is a schematic diagram of a projector according to a third embodiment of the present invention;

FIG. 7 is a schematic diagram of a projector according to a fourth embodiment of the present invention;

DETAILED DESCRIPTION

Exemplary embodiments of an illuminating apparatus, an image display apparatus, and a projector according to the present invention are explained in detail below with reference to the accompanying drawings.

Figure 1:
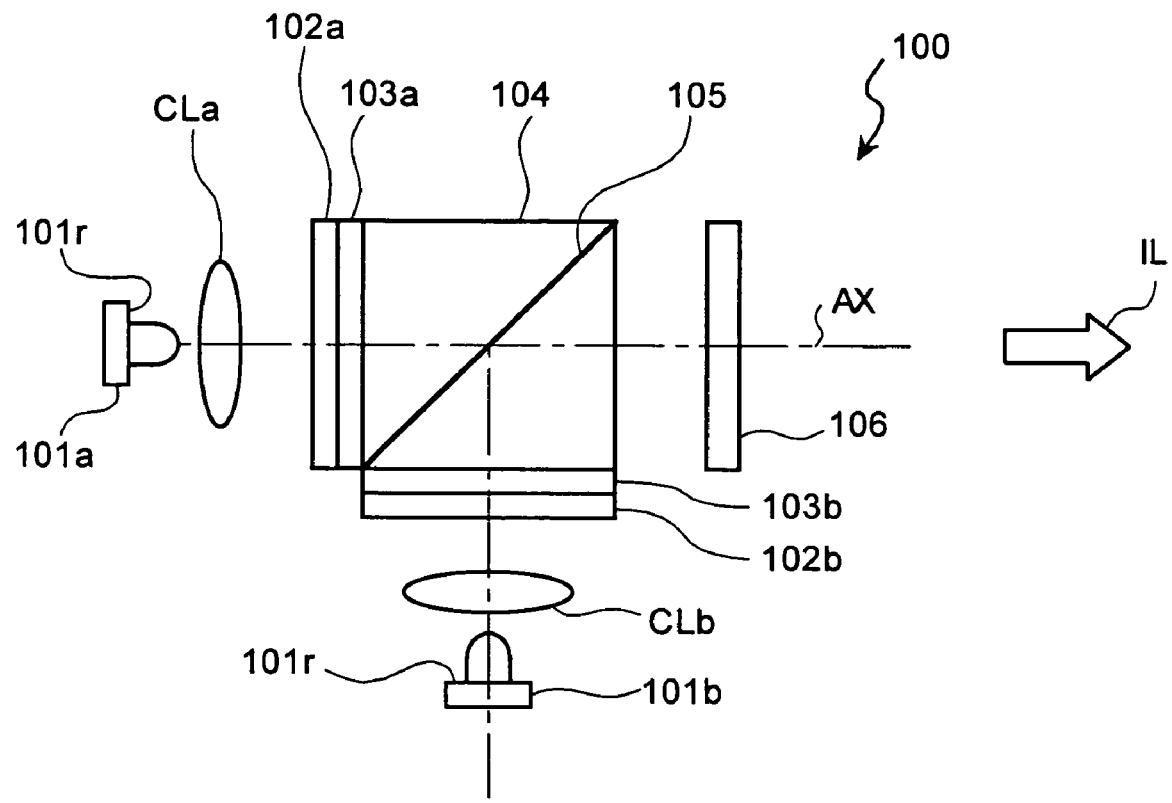
FIG. 1 is a schematic diagram of an illuminating apparatus according to a first embodiment of the present invention.

FIG. 1 is a schematic diagram of an illuminating apparatus according to a first embodiment of the present invention. The illuminating apparatus 100 includes a first LED 101a that is a first solid light-emitting element and a second LED 101b that is a second solid light-emitting element. Both the first LED 101a and the second LED 101b emit light of same wavelength region, for example, a G-light. The G-light from the first LED 101a is incident on a collimating lens CLa. The collimating lens CLa converts the incident light into a substantially parallel light. The substantially parallel light is incident on a polarizing beam splitter 104 that is a polarized-light combining unit. On a side of the polarizing beam splitter 104 toward the first LED 101a, a λ/4 waveplate 102a and a first reflection type polarizing plate 103a are bonded by an optically transparent adhesive.

The first reflection type polarizing plate 103a transmits a polarized light of one of a first oscillation direction and a second oscillation direction, for example, a p-polarized light, and reflects a polarized light of the other oscillation direction, for example, an s-polarized light. A wire grid type polarizer that is made by arranging a wire of a metal, for example, aluminum, on a substrate of a glass material that is optically transparent in a lattice shape may be used as for the first reflection type polarizing plate 103a. The wire grid type polarizer transmits a polarized light having the oscillation direction substantially perpendicular to the wire, and reflects a polarized light having the oscillation direction substantially parallel to the wire. By arranging the wire grid type polarizer in such a manner that the wire is perpendicular to the oscillation direction of a polarized light having a specific oscillation direction, it is possible to transmit the only polarized light having the specific oscillation direction. According to the present embodiment, the first reflection type polarizing plate 103a transmits, for example, the p-polarized light.

The p-polarized light passing through the first reflection type polarizing plate 103a is incident on the polarizing beam splitter 104. In the polarizing beam splitter 104, a polarizing film 105 is formed at about 45 degrees with respect to an optical axis AX. The polarizing film 105 transmits the p-polarized light, and reflects the s-polarized light. Therefore, the p-polarized light passing through the first reflection type polarizing plate 103a passes through the polarizing beam splitter 104, and goes straight to an illumination direction IL.

Light component that is different from the p-polarized light, and that is reflected at the first reflection type polarizing plate 103a, for example, the s-polarized light, passes through the λ/4 waveplate 102a, and returns to the first LED 101a. The first LED 101a includes a reflecting portion 101r that reflects the light that is reflected at the first reflection type polarizing plate 103a, and returns to the first LED 101a, to the polarizing beam splitter 104 that is a polarized-light combining unit. A metal electrode having a reflectivity serves as the reflecting portion 101r. The s-polarized light reflected at the reflecting portion 101r passes through the λ/4 waveplate 102a again. When a polarized light makes a round trip to pass through the λ/4 waveplate 102a twice, the oscillation direction of the polarized light is rotated by 90 degrees. As a result, the s-polarized light passed through the λ/4 waveplate 102a twice is converted into the p-polarized light. The p-polarized light converted passes through the first reflection type polarizing plate 103a, and is emitted from the polarizing beam splitter 104. In this manner, by repetition of reflection between the first reflection type polarizing plate 103a and the reflecting portion 101r, a phase of the light is changed to become a p-polarized light that transmits the first reflection type polarizing plate 103a. If absorption and loss of the light are not considered, the light experiencing the repetition of reflection finally becomes all p-polarized light; thereby it is possible to use the light from the first LED 101a with a high efficiency.

The second LED 101b emits the G-light in the same wavelength region as that of the first LED 101a. The G-light from the second LED 101b is incident on a collimating lens CLb. The collimating lens CLb converts the incident light into a substantially parallel light. The substantially parallel light is incident on a polarizing beam splitter 104 that is a polarized-light combining unit. On a side of the polarizing beam splitter 104 toward the second LED 101b, a λ/4 waveplate 102b and a second reflection type polarizing plate 103b are bonded by an optically transparent adhesive.

The second reflection type polarizing plate 103b transmits, for example, an s-polarized light, and reflects a p-polarized light. The s-polarized light passing through the second reflection type polarizing plate 103b is incident on the polarizing beam splitter 104. The polarizing film 105 transmits the s-polarized light, and reflects the p-polarized light. Therefore, the s-polarized light passing through the second reflection type polarizing plate 103b is reflected at the polarizing film 105 of the polarizing beam splitter 104, and is emitted to the illumination direction IL.

The p-polarized light reflected at the second reflection type polarizing plate 103b passes through the λ/4 waveplate 102b, and returns to the second LED 101b. The second LED 101b includes a reflecting portion 101r that reflects the light that is reflected at the second reflection type polarizing plate 103b, and returns to the second LED 101b, to the polarizing beam splitter 104 that is a polarized-light combining unit. The p-polarized light reflected at the reflecting portion 101r passes through the λ/4 waveplate 102b again. When a polarized light makes a round trip to pass through the λ/4 waveplate 102b twice, the oscillation direction of the polarized light is rotated by 90 degrees. As a result, the p-polarized light passed through the λ/4 waveplate 102b twice is converted into the s-polarized light. The s-polarized light converted passes through the second reflection type polarizing plate 103b, and is reflected at the polarizing film 105 of the polarizing beam splitter 104. In this manner, by repetition of reflection between the second reflection type polarizing plate 103b and the reflecting portion 101r, a phase of the light is changed to become an s-polarized light that transmits the second reflection type polarizing plate 103b. If the absorption and the loss of the light are not considered, the light experiencing the repetition of reflection finally becomes all s-polarized light; thereby it is possible to use the light from the second LED 101b with a high efficiency.

Furthermore, when looking at the illuminating apparatus 100 from the illumination direction IL, both the first LED 101a and the second LED 101b are arranged at an optically equivalent position. Therefore, it is possible to guide the light from at least two solid light-emitting elements 101a and 101b to the same illumination direction IL, without increasing a dimension of an emission area of the solid light-emitting element.

Instead of the reflection type polarizing plate, a polarization converting element, which uses a plurality of conventional polarizing beam splitter arrays, may also be used. Employing the polarizing beam splitter array increases the dimension of the emission area. For this reason, if a predetermined etendue is satisfied, it is possible to use the polarizing beam splitter array.

Furthermore, even when the λ/4 waveplate 102a and the λ/4 waveplate 102b are not used, it is possible to obtain an illumination light with the high brightness and the high usability, although the high energy conversion efficiency decreases more or less.

A liquid crystal type modulating element as a phase modulating element, for example, a liquid crystal panel 106 modulates an incident light in response to an input signal. Besides, the liquid crystal panel 106 does not require a polarizing plate, and for example, a TN mode liquid crystal panel can be used. The liquid crystal panel 106 can easily convert the s-polarized light into the p-polarized light. Therefore, this illuminating apparatus can supply an illuminating light of a uniform polarization component; thereby it is possible to supply an illumination light with the high brightness and the high usability, of which the polarization direction is uniform, to the illumination direction IL.

It is desirable turn on an off the first LED 101a and the second LED 101b alternately. Regarding the solid light-emitting element, such as the LED, it is possible to reduce a rise in temperature by performing an alternate driving. With a reduction of the rise in temperature, it is possible to increase an injection current; and with an increase of the injection current, an amount of light flux increases. Therefore, by performing the alternate driving of the two LEDs 101a and 101b, it is possible to increase the amount of the light flux of each of the LEDs, and to obtain an illumination light of a high brightness.

Figure 2A:
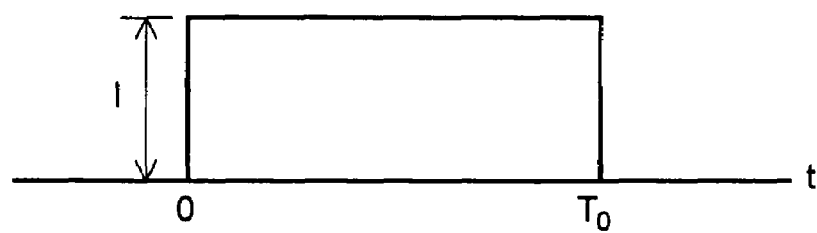
FIG. 2A is a graph of a turn-on time versus an injection current when driving an illuminating apparatus according to a conventional technology.
Figure 2B:
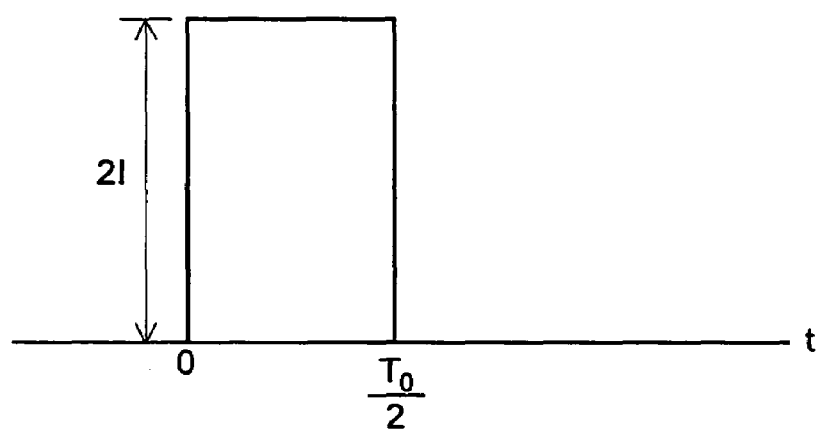
FIG. 2B and FIG. 2C are graphs of the turn-on time versus the injection current when driving the illuminating apparatus according to the first embodiment.
Figure 2C:
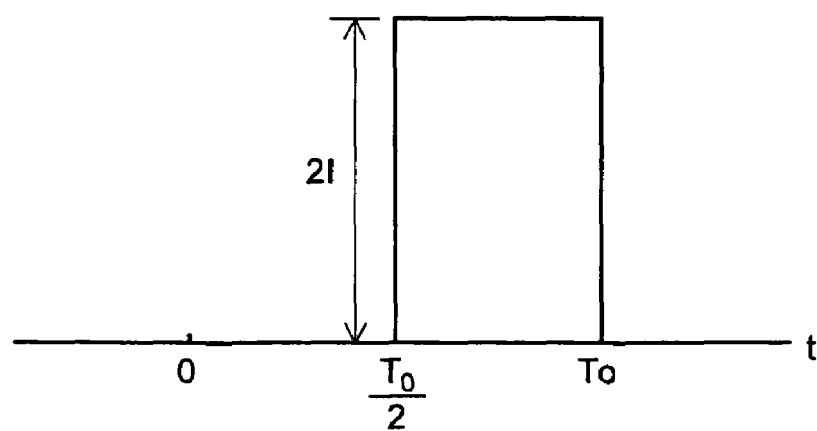

FIG. 2A is a graph of a turn-on time (horizontal axis: time t) versus an injection current (vertical axis: current I) when driving a single LED according to a conventional technology. FIG. 2B is a graph of a turn-on time versus an injection current for the first LED 101a; and FIG. 2C is a graph of a turn-on time versus an injection current for the first LED 101b. As shown in FIG. 2B and FIG. 2C, when turning on the two LEDs 101a and 101b alternately, the turn-on time of each of the LEDs can be reduced to ½, compared to the conventional technology. As the turn-on time is reduced, it is possible to increase the injection current up to two times, compared to the conventional technology. As a result, an illumination with a high brightness can be obtained.

Furthermore, the same current I can also be used for the LEDs 101a and 101b as that in the conventional technology. At this time, emission efficiencies of the LEDs 101a and 101b increase because an amount of heating decreases by the alternate driving. Therefore, an illumination with a high brightness can still be obtained.

In addition, the phase modulating element, the liquid crystal panel 106, is driven in synchronization with timing of the alternate driving of the LEDs 101a and 101b. For example, when the first LED 101a is turned on, the liquid crystal panel 106 is in an OFF state to transmit the p-polarized light. On the other hand, when the first LED 101*a* is turned off and the second LED 101*b* is turned on, the liquid crystal panel 106 is in an ON state, and rotates the p-polarized light by 90 degrees to convert it into s-polarized light. With this mechanism, for example, an illumination light of uniform p-polarized light with a high brightness can be obtained. The liquid crystal panel 106 may also be configured so as to rotate a phase of light in the OFF state, and transmit the light as it is in the ON state.

As the phase modulating element, a ferroelectric, such as a lanthanum-doped lead zirconium titanate (PLZT), can also be used. The PLZT is a material having an electro-optic (EO) effect. When an electric field is applied to a crystal or a ceramic of the PLZT, the refractive index of the crystal or the ceramic is changed. With a change of the refractive index, it is possible to rotate the phase of the light.

Figure 3:
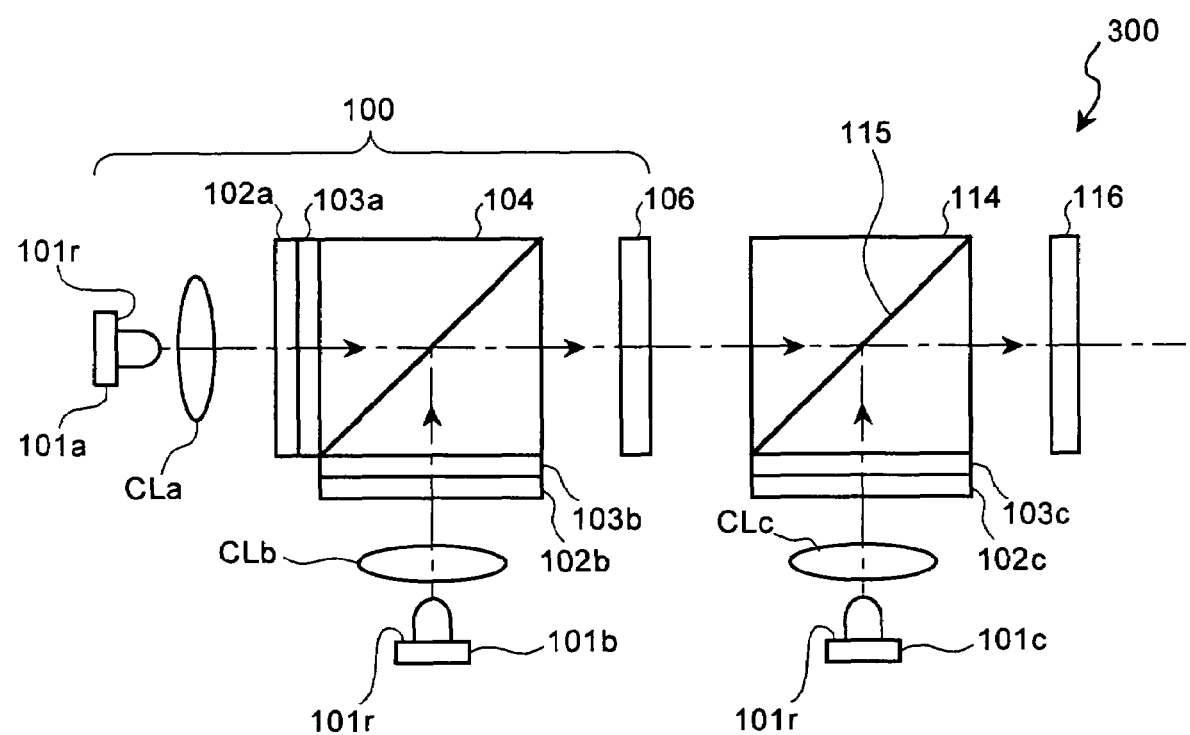
FIG. 3 is a schematic diagram of an illuminating apparatus according to a modification of the first embodiment.

The number of the LEDs as the solid light-emitting element is not limited to two, but it can be configured with more than three. For example, FIG. 3 is a schematic diagram of an illuminating apparatus 300 in which three LEDs 101*a*, 101*b*, and 101*c* are used. The configuration from the LEDs 101*a* and 101*b* to the liquid crystal panel 106 is the same as that of the illuminating apparatus 100. The illuminating apparatus 300 further includes a third LED 101*c*, a polarizing beam splitter 114, a polarizing film 115, and a liquid crystal panel 116. By using the same optical system as used for the second LED 101*b*, it is configured such that the s-polarized light is produced with a high efficiency from the third LED 101*c*. And finally, the s-polarized light is converted into uniform p-polarized light. With this mechanism an illumination light with a higher brightness can be obtained. According to this modification of the first embodiment, a turn-on time for a single LED can be T/3.

Figure 4:
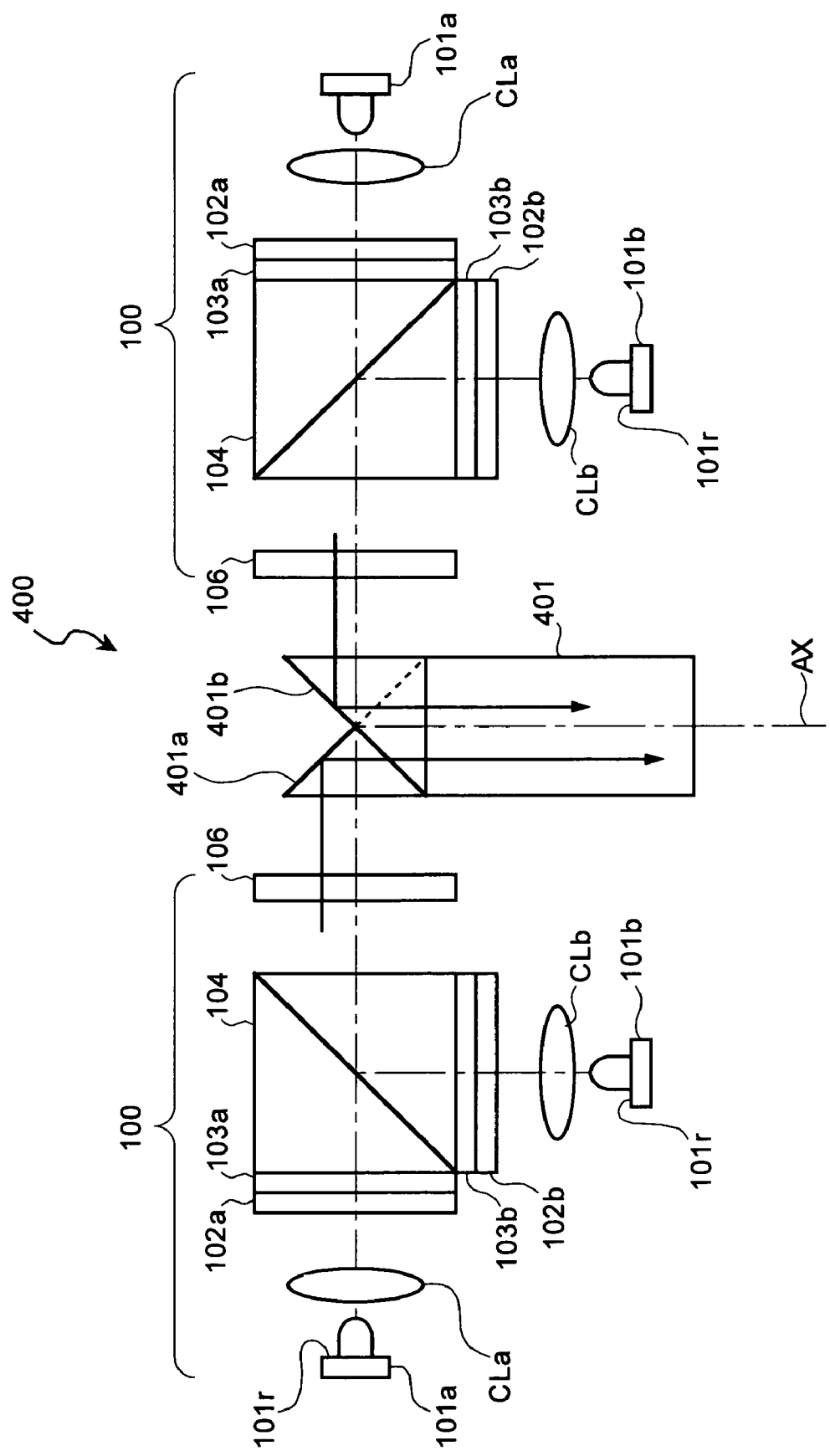
FIG. 4 is a schematic diagram of an illuminating apparatus according to another modification of the first embodiment.

As an example of another modification, an illuminating apparatus 400 in which four LEDs are used is shown in FIG. 4. The illuminating apparatus 400 includes a pair of the illuminating apparatuses 100 arranged in face-to-face layout. The G-light from each of the illuminating apparatuses 100 is guided to a rod lens 401 by two triangular prisms 401*a* and 401*b*. With this modification, the turn-on time for a single LED is T/2. According to the present modification, an illumination light with an even higher brightness can be obtained.

Figure 5:
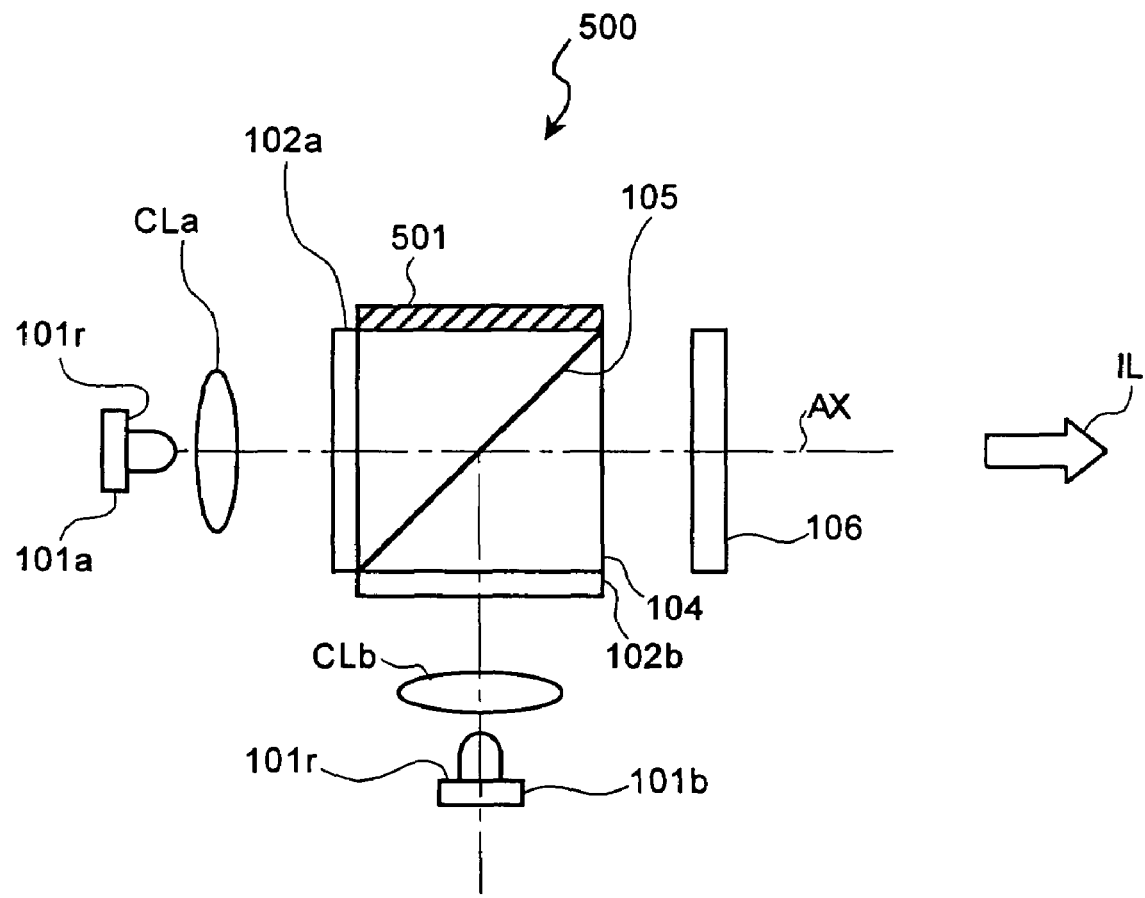
FIG. 5 is a schematic diagram of an illuminating apparatus according to a second embodiment of the present invention.

FIG. 5 is a schematic diagram of an illuminating apparatus 500 according to a second embodiment of the present invention. The same reference numerals are used for the same parts as those for the first embodiment, and overlapped descriptions are omitted. According to the second embodiment, a mirror 501 is used instead of the reflection type polarizing plate. The mirror 501 is attached on a surface of the polarizing beam splitter 104 where the beam is emitted in a direction different from the illumination direction IL. Light from the first LED 101*a* is incident on the polarizing film 105 of the polarizing beam splitter 104. For example, the polarizing film 105 transmits the p-polarized light, and reflects the s-polarized light. The s-polarized light reflected at the polarizing film 105 is deflected by 90 degrees, and incident on the mirror 501. The s-polarized light is reflected at the mirror 501 to the polarizing film 105, and reflected at the polarizing film 105 to the first LED 101*a*. Then the s-polarized light reflected at the polarizing film 105 passes through the λ/4 waveplate 102*a* and the collimating lens CLa, and is reflected at the reflecting portion 101*r*. The p-polarized light reflected at the reflecting portion 101*r* passes through the λ/4 waveplate 102*a* again. The s-polarized light is converted into the p-polarized light by passing through the λ/4 waveplate 102*a* twice. The p-polarized light converted passes through the polarizing film 105, and is emitted from the polarizing beam splitter 104.

Light from the second LED 101*b* is incident on the polarizing film 105 of the polarizing beam splitter 104. The s-polarized light reflected at the polarizing film 105 is deflected by 90 degrees, and is emitted from the polarizing beam splitter 104. On the other hand, the p-polarized light passing through the polarizing film 105 is incident on the mirror 501. The p-polarized light is reflected at the mirror 501 to the polarizing film 105, and passes through the polarizing film 105. Then the p-polarized light passing through the polarizing film 105 passes through the λ/4 waveplate 102*b* and the collimating lens CLb, and is reflected at the reflecting portion 101*r*. The p-polarized light reflected at the reflecting portion 101*r* passes through the λ/4 waveplate 102*b* again. The p-polarized light is converted into the s-polarized light by passing through the λ/4 waveplate 102*a* twice. The s-polarized light converted is reflected at the polarizing film 105, and is emitted from the polarizing beam splitter 104.

In the same way as in the first embodiment, the first LED 101*a* and the second LED 101*b* are driven alternately. At the same time, the liquid crystal panel 106 is switched between turning on and off in synchronization with timing of the alternate driving of the LEDs 101*a* and 101*b*. With this mechanism, for example, an illumination light of uniform p-polarized light with a high brightness and a high usability can be obtained.

FIG. 6 is a schematic diagram of a projector 600 according to a third embodiment of the present invention. The projector 600 includes a first light source unit 601R that supplies a first color light (R-light), a second light source unit that supplies a second color light (G-light), which is the illuminating apparatus 100 according to the first embodiment, and a third light source unit that supplies a third color light (B-light). Each of the light source units is a solid light-emitting element composed of LEDs.

The R-light from the first light source unit 601R is incident on a polarization converting element 603R after passing through a collimating lens 602R. The polarization converting element 603R converts the R-light into a polarized light of a specific oscillation direction, for example, a p-polarized light. The R-light with the polarization converted is incident on a first color spatial light modulating device, a spatial light modulating device for R-light 610R. The spatial light modulating device for R-light 610R is a transmission type liquid crystal display device that modulates the R-light with the polarization converted according to an image signal. The spatial light modulating device for R-light 610R includes a liquid crystal panel 615R, a first polarizing plate 616R, and a second polarizing plate 617R.

The first polarizing plate 616R transmits the R-light converted into the p-polarized light so that the R-light converted into the p-polarized light is incident on the liquid crystal panel 615R. The liquid crystal panel 615R modulates the p-polarized light according to the image signal to convert the p-polarized light into an s-polarized light. The second polarizing plate 617R transmits the R-light converted into the s-polarized light at the liquid crystal panel 615R. In this manner, the spatial light modulating device for R-light 610R modulates the R-light from the first light source unit 601R. The R-light converted into the s-polarized light at the spatial light modulating device for R-light 610R is incident on a cross dichroic prism 612.

The G-light from the second light source unit, the illuminating apparatus 100, is incident on a polarization converting element 603G. The polarization converting element 603G converts the G-light into a polarized light of a specific oscillation direction, for example, an s-polarized light. The G-light with the polarization converted is incident on a second color spatial light modulating device, a spatial light modulating device for G-light 610G. The spatial light modulating device for G-light 610G is a transmission type liquid crystal display device that modulates the G-light with the polarization converted according to an image signal. The spatial light modulating device for G-light 610G includes a liquid crystal panel 615G, a first polarizing plate 616G, and a second polarizing plate 617G.

The first polarizing plate 616G transmits the G-light converted into the s-polarized light so that the G-light converted into the s-polarized light is incident on the liquid crystal panel 615G. The liquid crystal panel 615G modulates the s-polarized light according to the image signal to convert the s-polarized light into a p-polarized light. The second polarizing plate 617G transmits the G-light converted into the p-polarized light at the liquid crystal panel 615G. In this manner, the spatial light modulating device for G-light 610G modulates the G-light from the second light source unit 100. The G-light converted into the p-polarized light at the spatial light modulating device for G-light 610G is incident on the cross dichroic prism 612.

The G-light from the first light source unit 601G is incident on a polarization converting element 603G after passing through a collimating lens 602G. The polarization converting element 603B converts the B-light into a polarized light of a specific oscillation direction, for example, a p-polarized light. The B-light with the polarization converted is incident on a third color spatial light modulating device, a spatial light modulating device for B-light 610B. The spatial light modulating device for B-light 610B is a transmission type liquid crystal display device that modulates the B-light with the polarization converted according to an image signal. The spatial light modulating device for B-light 610B includes a liquid crystal panel 615B, a first polarizing plate 616B, and a second polarizing plate 617B.

The first polarizing plate 616B transmits the B-light converted into the p-polarized light so that the B-light converted into the p-polarized light is incident on the liquid crystal panel 615B. The liquid crystal panel 615B modulates the p-polarized light according to the image signal to convert the p-polarized light into an s-polarized light. The second polarizing plate 617B transmits the B-light converted into the s-polarized light at the liquid crystal panel 615B. In this manner, the spatial light modulating device for B-light 610B modulates the B-light from the third light source unit 601B. The B-light converted into the s-polarized light at the spatial light modulating device for B-light 610B is incident on the cross dichroic prism 612.

The cross dichroic prism 612 includes two of dichroic films 612a and 612b. The two of dichroic films 612a and 612b are arranged in a shape of the letter X at right angles to each other. The dichroic film 612a reflects the R-light that is the s-polarized light, and transmits the G-light that is the p-polarized light. In this manner, the cross dichroic prism 612 combines the R-light, the G-light, and the B-light modulated at the first color spatial light modulating device 610R, the second color spatial light modulating device 610G, and the third color spatial light modulating device 610B, respectively. A projection lens 630 projects the light combined at the cross dichroic prism 612 to a screen 640.

The projector 600 employs the illuminating apparatus 100 that supplies light of a high brightness and a high usability. Therefore, it is possible to obtain a fine projection image that is bright and high quality. Particularly, in the above configuration, to obtain a projection image of a white color as a whole by projecting the R-light, the G-light, and the B-light, the light flux of the G-light is required to be about 60% to 80% of the whole light flux. For this reason, if the light flux from a single solid light-emitting element, an LED, is the same, it is necessary to arrange more LEDs for the illuminating apparatus 100 than for the first light source unit 601R and the third light source unit 601B. According to the present embodiment, the illuminating apparatus 100 drives two of the LEDs 101a and 101b alternately with a predetermined interval. Therefore, as described in the first embodiment, it is possible to make the light flux of the G-light from the second light source unit, the illuminating apparatus 100, greater than those from the first light source unit 601R and the third light source unit 601B that are composed of a single LED, respectively. Furthermore, an emitting area of the second light source unit, the illuminating apparatus 100, is the same as that of the single LED. For this reason, regarding the G-light, it is possible to obtain an illumination light of a high brightness without increasing the etendue. As a result, a fine projection image can be obtained.

FIG. 7 is a schematic diagram of a projector 700 according to a fourth embodiment of the present invention. A first solid light-emitting element, a first LED 701a, and a second solid light-emitting element, a second LED 701b, provides a white light. The white light mentioned here includes both light of a wavelength region where a spectral distribution of the light is continuously broad and light having discrete peak wavelengths for the R-light, the G-light, and the B-light, respectively. The first LED 701a and the second LED 701b have a same configuration, so that the first LED 701a is explained as an example. Light emitted from the first LED 701a is reflected by a reflector 702a to a polarizing beam splitter 704. A focusing lens 703a having a positive refracting power focuses the light directly from the first LED 701a and the light reflected at the reflector 702a at an aperture 708. With this arrangement, the light from the first LED 701a is incident on a predetermined surface of the polarizing beam splitter 704. Similarly, light emitted from the second LED 701b is incident on other surface of the polarizing beam splitter 704.

The polarizing beam splitter 704 as a polarized-light combining unit is structured by bonding two triangular prisms. A polarizing film 704a composed of a dielectric multilayer film is formed on a bonding surface. The polarizing film 704a transmits a polarized light of a first oscillating direction, for example, a p-polarized light, and reflects light of a second oscillating direction that is substantially perpendicular to the first oscillating direction, for example, an s-polarized light. With this mechanism, the polarizing beam splitter 704 transmits the p-polarized light component from among the light from the first LED 701a to an illumination direction, and reflects the s-polarized light component from among the light from the second LED 701b to the illumination direction. On the contrary, the polarizing film 704a may be formed in such a manner that the p-polarized light is reflected and the s-polarized light is transmitted.

The p-polarized light and the s-polarized light emitted from the polarizing beam splitter 704 are incident on a phase modulating element, a liquid crystal panel 705. The liquid crystal panel 705 has an advantage of a low price and an easy usability. While the first LED 701a is turned on, the second LED 701b is turned off. The liquid crystal panel 705 rotates the oscillation direction of an incident light by 90 degrees according to an input signal. For example, when the p-polarized light from the first LED 701a is incident, the liquid crystal panel 705 transmits the p-polarized light as it is without rotating the oscillation direction. On the other hand, when the s-polarized light from the second LED 701b is incident, the liquid crystal panel 705 rotates the s-polarized light by 90 degrees to convert the s-polarized light into the p-polarized light. In this manner, after passing through the liquid crystal panel 705, the light becomes the p-polarized light of even oscillation direction.

The light passing through the liquid crystal panel 705 is incident on one surface of a triangular prism 706 that has a function of a solid rod integrator. The aperture 708 is formed at an incident surface of the triangular prism 706. A mirror 707 as a reflecting portion is formed on a circumference of the aperture 708. The focusing lenses 703a and 703b focus the light at a vicinity of the aperture 708. With this configuration, the light from the first LED 701a and the second LED 701b are incident on the triangular prism 706 with a high efficiency. The p-polarized light incident on the triangular prism 706 is reflected at a slant, and deflected by 90 degrees. The p-polarized light deflected is incident on a rod integrator 709. The rod integrator 709 is in a hollow shape with a reflecting surface formed on an inner surface. The triangular prism 706 is bonded on one end of the rod integrator 709. The triangular prism 706 and the rod integrator 709 together are functioned as a single integrating optical element. The incident light is repeatedly reflected at the inner surface of the rod integrator 709 so that the intensity distribution becomes substantially even. Specifically, by employing the rod integrator 709 in the hollow shape, even light having a larger angle than a total reflection angle can be utilized by repeatedly reflecting the light at the inner surface. Therefore, the usability of the light becomes far more improved.

A color filter 710 that transmits light in a specific wavelength region, and reflects light in other wavelength region that is different from the specific wavelength region is arranged on an illumination direction of the rod integrator 709. The color filter 710 is structured from a plurality of sets of color filters with three of the color filters, a color filter for the R-light, a color filter for the G-light, and a color filter for the B-light as one set. The color filter for the R-light transmits the R-light, and reflects other color lights. The color filter for the G-light transmits the G-light, and reflects other color lights. The color filter for the B-light transmits the B-light, and reflects other color lights. The color filter for each of the colors is formed corresponding to each of pixels of a spatial light modulating device 711.

From among the light from the rod integrator 709, the R-light incident on the color filter for the R-light passes through the color filter for the R-light. On the contrary, the G-light and the B-light from among the light from the rod integrator 709 are reflected at the color filter for the R-light. As described above, the mirror 707 that is the reflecting portion reflecting the light, which is reflected at the color filter 710 and proceeds to a direction to the first LED 701a, is formed on an end surface of the rod integrator 709 on the side of the light source.

The G-light and the B-light proceeding to the direction to the solid light-emitting element inside the rod integrator 709 are reflected again at the mirror 707. The G-light and the B-light reflected at the mirror 707 passes through the rod integrator 709 reach the color filter 710. At this moment, the G-light and the B-light are incident on another color filter 710 that is different from the color filter 710 on which the light incident at the first time, for example, the color filter for the G-light or the color filter for the B-light. In this manner, the G-light or the B-light passes through the color filter 710, and is emitted the illumination direction. A portion of the light that does not pass through the color filter 710 at the second time repeats the same procedure again. With this mechanism, all of the light can be emitted from the rod integrator 709. As a result, it is possible to illuminate the spatial light modulating device 711 with light having an even intensity distribution and a high brightness. By performing a recycle of the light using the above type of color filter 710, it is possible to improve the usability of the light by, for example, about 1.6 times, compared with the conventional technology.

The spatial light modulating device 711 modulates an incident light according to an image signal. A reflection type liquid crystal panel can be used as the spatial light modulating device 711. This provides a compact system that can obtain an image having an even intensity distribution and a high brightness. An image display apparatus is structured with a system from the first LED 701a and the second LED 701b to the spatial light modulating device 711.

A projection lens 712 enlarges an image, which is modulated by the spatial light modulating device 711, to project to a screen 713. With this arrangement, it is possible to obtain a full color projection image with an even intensity distribution.

Figure 8A:
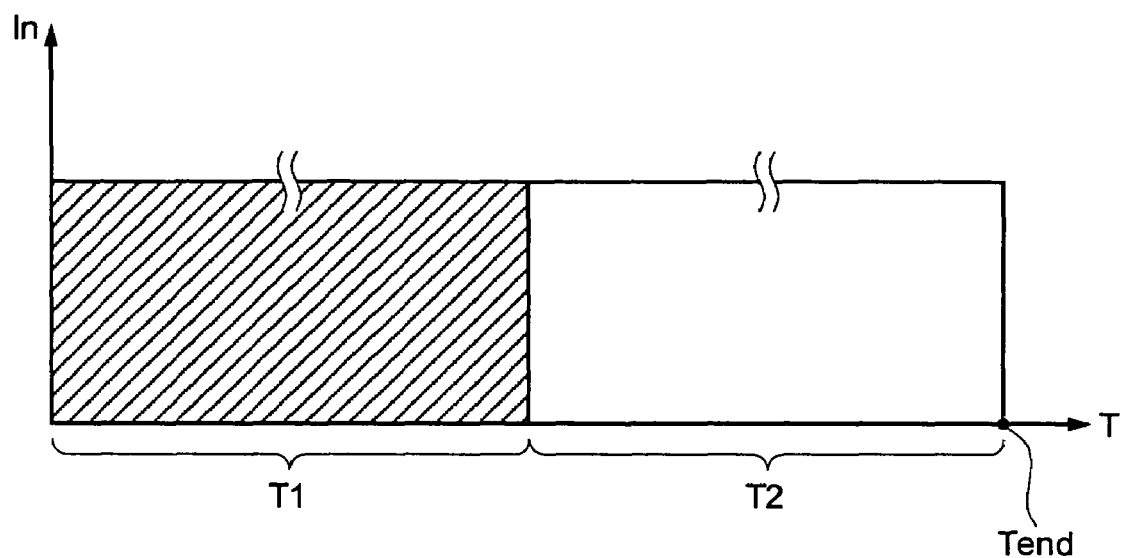
FIG. 8A and FIG. 8B are timing graphs for lighting LEDs in the projector according to the fourth embodiment.
Figure 8B:
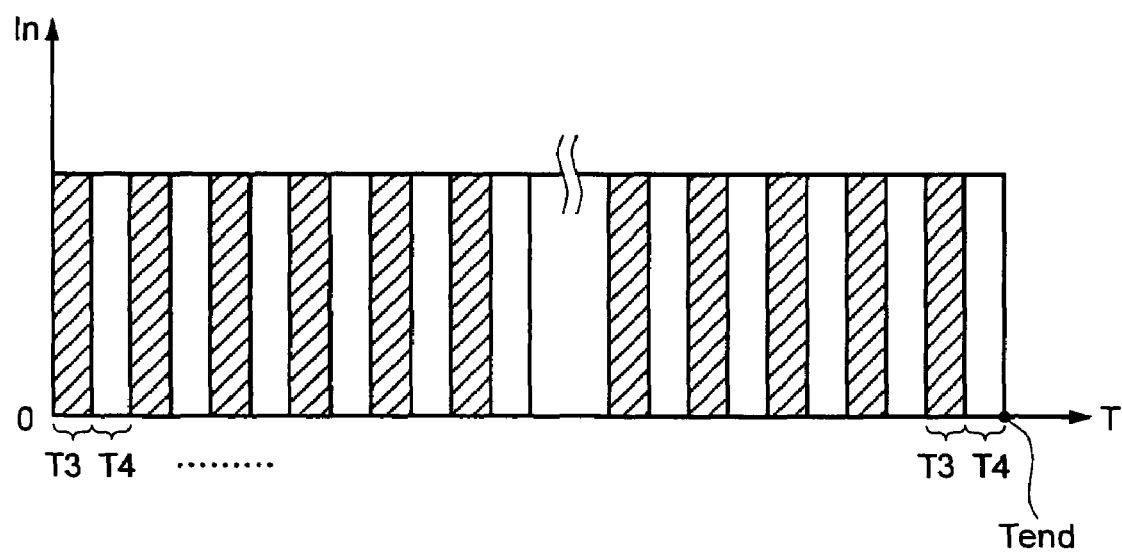

A turning timing for the first LED 701a and the second LED 701b is explained with reference to FIG. 8A and FIG. 8B. According to the present embodiment, one of the two LEDs 701a and 701b is selectively turned on while the other is turned off. By doing this, it is possible to maintain a current applying to a single LED larger than a predetermined value. Therefore, it is possible to illuminate the spatial light modulating device 711 with a brighter light compared to the conventional technology. In a graph shown in FIG. 8A, the horizontal axis indicates a turn-on time T; and the vertical axis indicates an arbitrary optical intensity In. Firstly, the first LED 701a is continuously turned on for a turn-on time T1 indicated by a hatched area. When intensity of the light from the first LED 701a becomes lower than a predetermined level, for example, when a turn-on life of the first LED 701a is terminated, the first LED 701a is turned off, and the second LED 701b is turned on. At this time, the first LED 701a and the second LED 701b are driven with a current value larger that that for the conventional technology, so that a brighter image can be obtained compared to the conventional technology. When a solid light-emitting element, an LED, is driven with a large current, the turn-on life becomes short. According to the present embodiment, the operation is switched to the second LED 701b at a time when the turn-on life of the first LED 701a becomes terminated. And the second LED 701b is continuously turned on. Therefore, it is possible to obtain a brighter image for a same turn-on life time Tend as that for a conventional light source employing a single LED.

Another example of the turn-on timing is explained with reference to FIG. 8B. The second LED 701b is turned on for a time T4 with turning on the first LED 701 for a time T3. Besides, the first LED 701a and the second LED 701b are alternately turned on. By turning on the two solid light-emitting elements alternately, it is possible to maintain a current applying to a single solid light-emitting element larger compared to a case when a single LED is continuously turned on. For this reason, it is possible to obtain a brighter image for a same turn-on life time Tend as that for a conventional light source employing a single LED. The spatial light modulating device 711 drives one frame of the image signal with a signal of 60 Hz. This enables to keep switching cycles of the liquid crystal panel 705 and the LED at 60 Hz.

Figure 9:
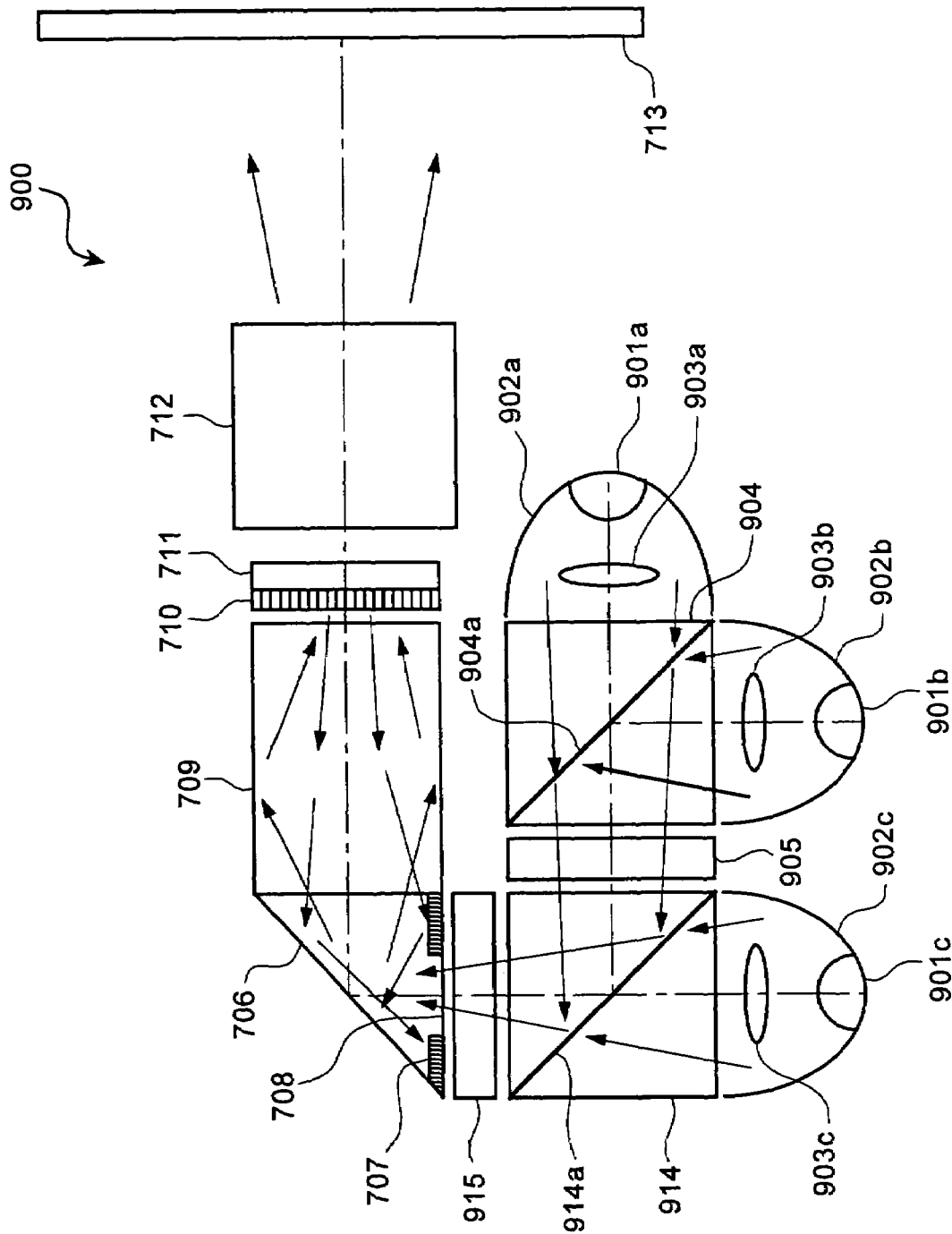
FIG. 9 is a schematic diagram of a projector according to a fifth embodiment of the present invention.

FIG. 9 is a schematic diagram of a projector 900 according to a fifth embodiment of the present invention. A difference from the fourth embodiment is that three LED are used. The same reference numerals are used for the same parts as those for the fourth embodiment, and overlapped descriptions are omitted. According to the present embodiment, a first LED 901a, a second LED 901b, and a third LED 901c are used. Each of the LEDs provides a white light. Just like the fourth embodiment, a reflector 902a and a focusing lens 903a are arranged at a vicinity of the first LED 901a. A reflector 902b and a focusing lens 903b are arranged at a vicinity of the second LED 901b. The reflectors 902a, 902b and the focusing lenses 903a, 903b have a refracting power so that the lights from the LEDs 901a, 902b are focused at a vicinity of an aperture 708. The lights form the first LED 901a and the second LED 902b are combined at a polarizing beam splitter 904. The light combined becomes a uniform s-polarized light by a polarization converting element, a liquid crystal panel 905. Then, the s-polarized light is incident on a polarizing beam splitter 914.

Light from the third LED 901c is focused at the vicinity of the aperture 708 by a reflector 902c and a focusing lens 903c. The light from the third LED 901c is also incident on the polarizing beam splitter 914. The polarizing beam splitter 914 transmits the p-polarized light, and reflects the s-polarized light. The liquid crystal panel 915 converts an incident light into, for example, a uniform p-polarized light.

The white lights from the three LEDs 901a, 901b, and 901c are made into uniform p-polarized lights, travel a similar optical path as in the fourth embodiment, and are incident on the spatial light modulating device 711. According to the present embodiment, the three LEDs 901a, 901b, and 901c are turned on alternately. By doing this, the turn-on time for a single LED can be even shorter, compared to the fourth embodiment. As a result, it is possible to apply even larger current to a single LED, and obtain even brighter illumination. Besides, as described referring to FIG. 8a, each of the LEDs may be turned on in order until the turn-on life is terminated.

Figure 10:
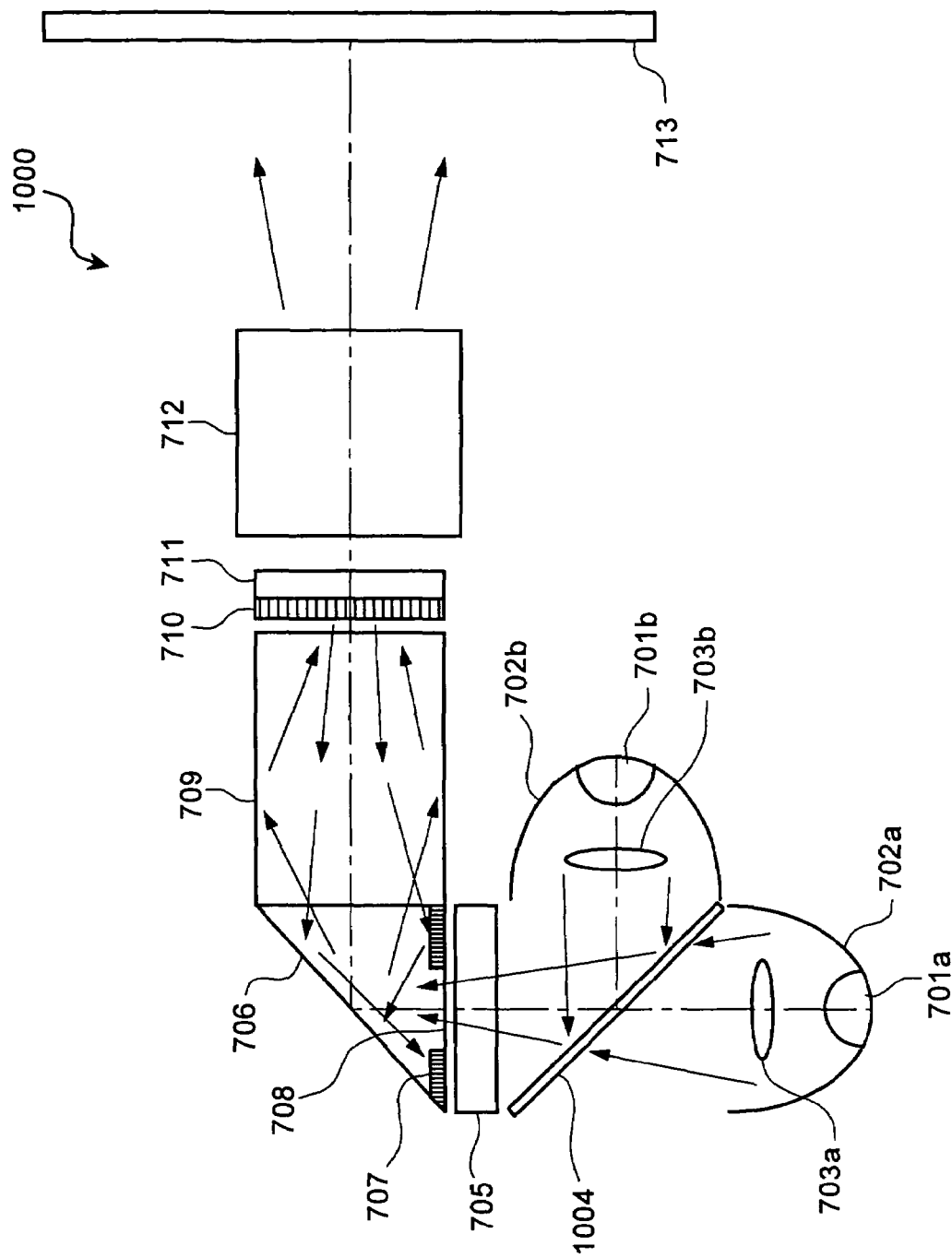
FIG. 10 is a schematic diagram of a projector according to a sixth embodiment of the present invention.

FIG. 10 is a schematic diagram of a projector 1000 according to a sixth embodiment of the present invention. A difference from the fourth embodiment is that a reflection type polarizing plate is used instead of the polarizing beam splitter. The same reference numerals are used for the same parts as those for the fourth embodiment, and overlapped descriptions are omitted.

An inorganic polarization plate 1004 can be used as the reflection type polarizing plate. An example of the inorganic polarization plate 1004 includes a polarization plate made of a metal, for example, aluminum. The reflection type polarizing plate has less incident angle dependence of polarization resolving characteristics, compared to the polarizing beam splitter. Therefore, it is possible to utilize light from the LED with a high efficiency. Besides, the inorganic polarization plate 1004 can be easily manufactured using a metal such as aluminum.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An illuminating apparatus comprising:
at least two solid light-emitting elements that supply light, the at least two solid light-emitting elements including a first solid light-emitting element and a second solid light-emitting element;
a polarized-light combining unit that combines a first polarized light of a first oscillation direction and a second polarized light of a second oscillation direction to guide the first polarized light and the second polarized light to an illumination direction by transmitting or reflecting the first polarized light and reflecting or transmitting the second polarized light, the first oscillating direction being substantially perpendicular to the second oscillating direction;
a phase modulating element that converts a polarized light from the polarized-light combining unit into either of the first polarized light and the second polarized-light;
at least two reflection-type polarizing plates, each of which transmits either of the first polarized light and the second polarized light, and reflects the other of the first polarized light and the second polarized light, each of the at least two reflection-type polarizing plates being arranged to transmit the light from corresponding one of the at least two solid light-emitting elements and disposed between the corresponding one of the at least two solid light-emitting elements and the polarized-light combining unit; and
a reflecting portion included in each of the at least two solid light-emitting elements, the reflecting portion reflecting polarized light reflected at the reflection-type polarizing plate in a direction to each of the at least two solid light-emitting elements, to a direction to the polarized-light combining unit.

2. An illuminating apparatus comprising:
at least two solid light-emitting elements that supply light, the at least two solid light-emitting elements including a first solid light-emitting element and a second solid light-emitting element;
a polarized-light combining unit that combines a first polarized light of a first oscillation direction and a second polarized light of a second oscillation direction to guide the first polarized light and the second polarized light to an illumination direction by transmitting or reflecting the first polarized light and reflecting or transmitting the second polarized light, the first oscillating direction being substantially perpendicular to the second oscillating direction;
a phase modulating element that converts a polarized light from the polarized-light combining unit into either of the first polarized light and the second polarized light;
a mirror that reflects a polarized light from the polarized-light combining unit proceeding to a direction different from the illumination direction to a direction to the polarized-light combining unit; and
a reflecting portion included in each of the at least two solid light-emitting elements, the reflecting portion reflecting polarized light reflected at the mirror in a direction to each of the at least two solid light-emitting elements, to a direction to the polarized-light combining unit.

3. The illuminating apparatus according to claim 1, wherein the phase modulating element is a liquid-crystal-type modulating element.

4. A projector comprising:
an illuminating apparatus that includes
at least two solid light-emitting elements that supply light, the at least two solid light-emitting elements including a first solid light-emitting element and a second solid light-emitting element;
a polarized-light combining unit that combines a first polarized light of a first oscillation direction and a second polarized light of a second oscillation direction to guide the first polarized light and the second polarized light to an illumination direction by transmitting or reflecting the first polarized light and reflecting or transmitting the second polarized light, the first oscillating direction being substantially perpendicular to the second oscillating direction; and a phase modulating element that converts a polarized light from the polarized-light combining unit into either of the first polarized light and the second polarized light;

at least two reflection-type polarizing plates, each of which transmits either of the first polarized light and the second polarized light, and reflects the other of the first polarized light and the second polarized light, each of the at least two reflection-type polarizing plates being arranged to transmit the light from corresponding one of the at least two solid light-emitting element and disposed between the corresponding one of the at least two solid light-emitting elements and the polarized-light combining unit; and a reflecting portion included in each of the at least two solid light-emitting elements, the reflecting portion reflecting polarized light reflected at the reflection-type polarizing plate in a direction to each of the at least two solid light-emitting elements, to a direction to the polarized-light combining unit;

a spatial light modulator that modulates an illumination light from the illuminating apparatus according to an image signal; and a projecting lens that projects the illumination light modulated by the spatial light modulator.

5. An image display apparatus comprising:

at least two solid light-emitting elements that supply light;

a polarized-light combining unit that combines a first polarized light of a first oscillation direction and a second polarized light of a second oscillation direction to guide the first polarized light and the second polarized light to an illumination direction by transmitting or reflecting the first polarized light and reflecting or transmitting the second polarized light, the first oscillating direction being substantially perpendicular to the second oscillating direction;

a phase modulating element that converts a polarized light from the polarized-light combining unit into either of the first polarized light and the second polarized light;

a rod integrator for making intensity distribution of the light from the solid light-emitting elements uniform;

a color filter that transmits light in a specific wavelength region from among the light from the rod integrator, and reflects light in a wavelength region different from the specific wavelength region;

a reflecting portion that is formed on an incident surface of a solid rod integrator which is integrated with the rod integrator, the reflecting portion being formed to reflect light reflected at the color filter in a reverse direction, to a direction to the color filter; and a spatial light modulating element that modulates light from the rod integrator according to an image signal.

6. The image display apparatus according to claim 5, wherein the at least two solid light-emitting elements include a first solid light-emitting element and a second solid light-emitting element, and the first solid light-emitting element and the second solid light-emitting element are turned on alternately with a predetermined time interval.

7. The image display apparatus according to claim 5, wherein the at least two solid light-emitting elements include a first solid light-emitting element and a second solid light-emitting element, and when intensity of the light from the first solid light-emitting element becomes less than a predetermined value while the first solid light-emitting element is continuously turned on, the first solid light-emitting element is turned off, and the second solid light-emitting element is turned on.

8. The image display apparatus according to claim 5, wherein the polarized-light combining unit includes an inorganic polarizing plate.

9. The image display apparatus according to claim 5, wherein the at least two solid light-emitting elements include three or more of the solid light-emitting elements.

10. The image display apparatus according to claim 5, wherein the rod integrator is in a hollow shape with a reflecting surface formed on an inner surface.

11. A projector comprising:

an image display apparatus that includes at least two solid light-emitting elements that supply light;

a polarized-light combining unit that combines a first polarized light of a first oscillation direction and a second polarized light of a second oscillation direction to guide the first polarized light and the second polarized light to an illumination direction by transmitting or reflecting the first polarized light and reflecting or transmitting the second polarized light, the first oscillating direction being substantially perpendicular to the second oscillating direction;

a phase modulating element that converts a polarized light from the polarized-light combining unit into either of the first polarized light and the second polarized light;

a rod integrator for making intensity distribution of the light from the solid light-emitting elements uniform;

a color filter that transmits light in a specific wavelength region from among the light from the rod integrator, and reflects light in a wavelength region different from the specific wavelength region;

a reflecting portion that is formed on an incident surface of a solid rod integrator which is integrated with the rod integrator, the reflecting portion being formed to reflect light reflected at the color filter in a reverse direction, to a direction to the color filter; and a spatial light modulating element that modulates light from the rod integrator according to an image signal; and a projection lens that projects light from the image display apparatus.

12. The illuminating apparatus according to claim 2, wherein the phase modulating element is a liquid-crystal-type modulating element.

13. A projector comprising:

an illuminating apparatus that includes at least two solid light-emitting elements that supply light, the at least two solid light-emitting elements including a first solid light-emitting element and a second solid light-emitting element;

a polarized-light combining unit that combines a first polarized light of a first oscillation direction and a second polarized light of a second oscillation direction to guide the first polarized light and the second polarized light to an illumination direction by transmitting or reflecting the first polarized light and reflecting or transmitting the second polarized light, the first oscillating direction being substantially perpendicular to the second oscillating direction; and a phase modulating element that converts a polarized light from the polarized-light combining unit into either of the first polarized light and the second polarized light;

a mirror that reflects a polarized light from the polarized-light combining unit proceeding to a direction different from the illumination direction to a direction to the polarized-light combining unit;

a reflecting portion included in each of the at least two solid light-emitting elements, the reflecting portion reflecting polarized light reflected at the mirror in a direction to each of the at least two solid light-emitting elements, to a direction to the polarized-light combining unit;

a spatial light modulator that modulates an illumination light from the illuminating apparatus according to an image signal; and a projecting lens that projects the illumination light modulated by the spatial light modulator.

14. The image display apparatus according to claim 1, wherein the at least two solid light-emitting elements include a first solid light-emitting element and a second solid light-emitting element, and the first solid light-emitting element and the second solid light-emitting element are turned on alternately with a predetermined time interval.

15. The image display apparatus according to claim 1, wherein the at least two solid light-emitting elements include a first solid light-emitting element and a second solid light-emitting element, and when intensity of the light from the first solid light-emitting element becomes less than a predetermined value while the first solid light-emitting element is continuously turned on, the first solid light-emitting element is turned off, and the second solid light-emitting element is turned on.

16. The image display apparatus according to claim 4, wherein the at least two solid light-emitting elements include a first solid light-emitting element and a second solid light-emitting element, and the first solid light-emitting element and the second solid light-emitting element are turned on alternately with a predetermined time interval.

17. The image display apparatus according to claim 4, wherein the at least two solid light-emitting elements include a first solid light-emitting element and a second solid light-emitting element, and when intensity of the light from the first solid light-emitting element becomes less than a predetermined value while the first solid light-emitting element is continuously turned on, the first solid light-emitting element is turned off, and the second solid light-emitting element is turned on.

* * * * *